United States Patent [19]

Stephany et al.

[11] 3,850,517

[45] Nov. 26, 1974

[54] HIGH SPEED PRINTOUT SYSTEM

[75] Inventors: Joseph F. Stephany, Sodus; Samuel W. Ing, Jr., Webster, both of N.Y.

[73] Assignee: Xerox Corporation, Rochester, N.Y.

[22] Filed: Sept. 25, 1972

[21] Appl. No.: 292,029

[52] U.S. Cl. .................... 354/12, 178/7.4, 340/378

[51] Int. Cl. .................... B41b 13/10

[58] Field of Search .............. 95/4.5; 340/324, 378; 178/7.4, 15; 354/12, 6; 346/76

[56] References Cited

UNITED STATES PATENTS

| | | | |
|---|---|---|---|
| 3,069,681 | 12/1962 | Sloan | 346/74 |
| 3,282,176 | 11/1966 | Morse | 95/4.5 X |
| 3,611,891 | 10/1971 | McNaney | 95/4.5 |

OTHER PUBLICATIONS

IBM Tech. Disclosure Bulletin, Vol. 13, No. 12, May 1971, pgs. 3757 & 3758.

*Primary Examiner*—John M. Horan

[57] ABSTRACT

A printing system including a photoreceptive surface having a charge placed over an area of the surface. An optical means for selectively discharging portions of that area is employed to form a charge and discharge portion representative of an electrostatic latent image. The optical means includes an array of light emitting solid state devices with appropriate logic circuitry for selectively energizing certain elements of the array in order to form the electrostatic latent image. A suitable developing station for developing the electrostatic images is provided, as well as means for transferring the developed image to a support.

More particularly, logic selection circuitry is coupled to each segment of a plurality of segments of the solid state devices, each of the segments including a plurality of solid state devices. The logic selection circuitry energizes select devices within each of the segments at a predetermined sequence of a plurality of line positions formed by the movement of the photoreceptive surface with respect to the linear array. Control means are coupled to the logic selection circuit and respond to the selection of a desired character for printing to initiate the predetermined sequence corresponding to the character representation provided by said logic selection circuitry.

5 Claims, 16 Drawing Figures

HIGH SPEED PRINTOUT SYSTEM

This invention relates to printing devices and more particularly to an improved device for optically forming images on a photoreceptive surface.

The operation of a communication printer relies upon the appearance of an electrical signal input corresponding to information to be printed which is converted into an appropriate alphanumeric, pictorial or graphic representation which is printed on a suitable support surface such as copy paper or the like. The present invention is applicable for use in a printing device which responds to pluralities of information input signals received in electrical form and which are translated into optical images and in turn employed in conjunction with a xerographic reproduction process employing electrostatic imaging or the like.

Prior art devices for bringing optical images into correspondence with a photoreceptive surface for purposes of reproduction have employed varying forms of optical generating devices each of which requiring complex optical lens arrangements and the like. Thus, for example, in U.S. Pat. No. 3,330,190, a cathode ray tube is employed for translating incoming electrical signals into light image of characters by illuminating areas of a plate containing a series of vertical columns with each of the various characters to be reproduced formed thereon, and bringing the particular characters illuminated into an on line orientation and thereby exposing a photosensitive surface. Such a device required that the photosensitive surface be advanced one line at a time in order to prevent skewing or blurring of the formation of the character as printed. In addition to requiring a complex lens arrangement, the foregoing device employing a cathode ray tube for illumination requires circuitry for deflection of a spot on the surface of the cathode ray tube for generating the optical light source. For relatively high speeds, requiring rapid deflection, the intensity of the light spot due to the persistence characteristic on the surface of the cathode ray tube becomes relatively less intense. Thus, the speed of such a system is relatively limited in accordance with the amount of intensity of light which can be generated at the surface of a cathode ray tube as a function of the deflection speed. In addition, the size of a cathode ray tube and its attendant electronic deflection circuitry as well as the lens arrangement necessary for coupling optical energy from the surface of the cathode ray tube through some means of projection requires a relatively large amount of space and further serves as a limitation on the practical utility of such an arrangement in a communication printing apparatus. With particular respect to character printing devices, in order that the requisite resolution can be provided by the character generator and that the speed requirements are sufficient to make the character generator an effective printer, it is necessary that a high speed, high intensity source for formation of the characters be provided.

In most commercial applications, within present day technology, it is not uncommon to find some form of reproduction apparatus. It would be desirable therefore to provide some means whereby such reproduction apparatus may be employed with minimum modification and revision to accommodate electrical inputs for conversion into a suitable corresponding representation to be printed on a copy paper. Prior art printing devices are, of course, always limited in printout speed due to the effects of the mechanical mechanisms necessary for the formation of the representations in accordance with the input signals.

In addition to the disadvantages noted above in connection with cathode ray tubes, it is noted that the cathode ray tube has a life of only approximately about a thousand hours and aside from being bulky, requires high voltages and corresponding power supply and close adjustments of electron optics.

It is therefore a prime object of the present invention to provide a non-mechanical printing system capable of operating at very high speeds with both alphanumeric, graphic and pictorial printout capability.

It is a further object of the present invention to provide a novel and unique printing system for operation in conjunction with a photoreceptive surface in a reproduction apparatus.

It is another object of the present invention to employ a non-deflecting optical system for translating electrical signals into appropriate alphanumeric, pictorial or graphic information on a photoreceptive surface.

It is another object of the present invention to provide a novel and unique apparatus for converting electrical information into alphanumeric, pictorial or graphic representations with a minimum of light loss and a maximum of efficiency.

The foregoing objects, as well as other objects of the present invention, are obtained by means of a printing system including a photoreceptive surface having a charge placed over an area of the surface. An optical means for selectively discharging portions of that area is employed to form a charge and discharge portion representative of an electrostatic latent image. The optical means includes an array of light emitting solid state devices which appropriate logic circuitry for selectively energizing certain elements of the array in order to form the electrostatic latent image. A suitable developing station for developing the electrostatic images is provided, as well as means for transferring the developed image to a support.

More particularly, logic selection circuitry is coupled to each segment of a plurality of segments of the solid state devices, each of the segments including a plurality of solid state devices. The logic selection circuitry energizes select devices within each of the segments at a predetermined sequence of a plurality of line positions formed by the movement of the photoreceptive surface with respect to the linear array. Control means are coupled to the logic selection circuit and respond to the selection of a desired character for printing to initiate the predetermined sequence corresponding to the character representation provided by said logic selection circuitry.

A further understanding of the invention as well as the realization of other objects and descriptions of further features thereof will become more apparent with reference of the following detailed description of the present invention taken in connection with the accompanying drawings wherein.

Figure 1:
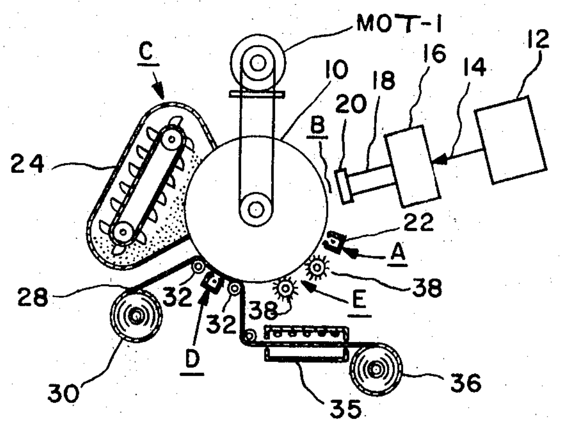
FIG. 1 is a schematic view of a printing system suitable for use with the present invention.

Referring now to FIG. 1, there is shown a schematic representation of one embodiment of a xerographic printer. As shown, the printer contains a xerographic drum 10 having a photoconductive surface thereon. A plurality of electrical input signals are derived from an input/output computer control unit 12 and are coupled by means of an interfacing line 14 to a selection device 16. The selection device 16 is in turn coupled by a plurality of lines indicated generally as 18 to an optical generating device 20. In accordance with this invention, the optical generating device 20 includes a plurality of solid state light emitting devices such as diodes arranged in an array for selection by means of the selector circuitry 16 in accordance with the electrical signals derived from the input/output computer control unit 12. The operation of the solid state light emitting device and the array will be explained in further detail below.

The apparatus shown herein for translating optical images to printed symbols on a sheet of paper in a xerographic apparatus which is well known in the art. The same results may be accomplished by using any photosensitive surface in place of the xerographic drum 10, however, the xerographic apparatus shown is illustrative of the type that may be used. The drum 10 containing a photoconductive surface, which is normally an insulating surface in the dark, is driven through a series of process stations by a motor MOT-1.

As the drum 10 is driven by the motor MOT-1 past a charging station A, a Corotron 22 places a uniform electrostatic charge on the surface of the drum. The drum then rotates to an exposure station B wherein the drum surface is exposed to a light image of the information to be printed. The light of the images renders the photoconductive surface conductive rather than insulating and discharges the electrostatic charge in the image areas so that the drum surface contains uncharged areas in image configuration. The drum then rotates to developing station C wherein a developer material containing a triboelectric charge of the same polarity as the charge on the drum surface is cascaded over the surface of the drum. The developer material consists of a finely divided, pigmented, resinous powder herein referred to as "carrier particles." The developer material is supplied from a reservoir in the bottom of the developer housing 24 to the plate surface by means of a conveyor 26 and is cascaded over the drum surface back to the reservoir at the bottom of the developer housing. The carrier particles carry the toner material from the reservoir to the drum surface and upon contact with the non-charged image areas the toner material adheres to the drum surface, while in the non-image or charged areas the toner material is repelled by the charge on the drum surface and returns with the carrier material to the reservoir. Thus, a powder image of the light image to which the drum was exposed at station B is developed on the drum surface. The drum then rotates past a transfer station D wherein a web of paper or other suitable material 28 is supplied from a supply roll 30 over a pair of guide rollers 32 into contact with the surface of the xerographic drum. A transfer Corotron 34 places an electrostatic charge on the surface of the web of paper while the paper is in contact with the drum surface. The electrostatic charge is of opposite polarity to the charge on the toner material and thus attracts the toner material from the surface of the drum onto the web of paper. The paper then passes through a heat fuser 35 wherein heat supplied to the paper and the toner material causes the toner to coalesce and bond to the surface of the web. The web then contains a permanent image of the powder image transferred from the drum surface to the paper and is accumulated on a takeup roll 36. After the transfer operation the drum is rotated past a cleaning station E wherein a pair of rotating brushes 38 remove any residual powder from the drum surface prior to recharging and re-exposing the drum. The operation of a xerographic apparatus is well known in the art and does not require a detailed discussion herein. Obviously, individual sheets can be employed in lieu of a continuous web for image transfer, and other forms of electrostatographic devices may be employed within the framework of the present invention.

Figure 2:
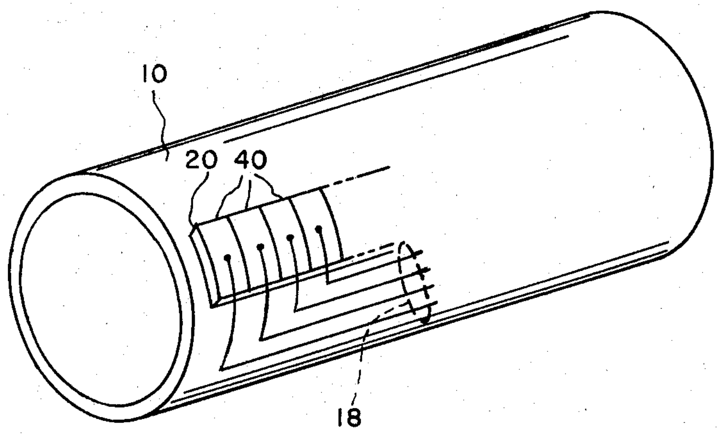
FIG. 2 illustrates the manner wherein a linear array of solid state light emitting devices is positioned transverse to the movement of a rotating photoreceptive surface.

Referring now to FIG. 2, the configuration of the solid state light emitting device 20 with respect to the photoreceptor surface 10 is illustrated in greater detail. As shown, the printout system employs a line by line configuration wherein a photoreceptor is adapted for rotational or linear movement in a direction transverse to the line formed by the linear array of solid state light emitting devices. In accordance with the invention, the light emitting device 20 consists of a plurality of light emitting diodes 40, each of which having coupled thereto a conductor illustrated generally as 18 which may be employed for selectively actuating a desired diode.

The solid state light emitting device or diode 40 may consist of a gallium arsenide phosphide light emitting PN junction diode. When biased in the forward direction, the injected holes and electrons recombine in the junction region and the direct band to band recombination results in photon emission with the emitted photons having energies corresponding roughly to the band gap energy as is well known. Most PN junction light emission devices operate most efficiently with materials having band gap energies equal to or less than 1.9 electron volts or roughly 6,500 Angstroms in terms of light wavelength. Gallium arsenide phosphide diodes have proven to be one of the best and more efficient light emitting diode materials for room temperature operation and for producing light in the indicated spectrum. It is further characteristic of a PN junction light emitting diode that the light emission can be triggered on and off in sub-microsecond time which would be a necessary feature of a high speed operation. When operating under a duty cycle of 10 percent, the current input to the diode, or the light output therefrom, can be increased four to five times over the rated value. With regard to xerographic processing, efficient coupling to the reproduction photoreceptor surface would necessitate the use of a high speed photoconductor which would respond efficiently to the 6,500 Angstrom light output of the diode. The photoconductor efficiency is primarily governed by its carrier generation efficiency and carrier collection efficiency which is related to the carrier transit speed and trapping effect. It is noted that conventionally available photoconductors consisting of a selenium arsenide coating in the ratio of 60–40 percent, respectively, with a thickness of approximately 60 microns, coated upon a conductive base such as aluminum or brass exhibits a spectral sensitivity in the 6,500 Angstrom range sufficient to provide a discharge level relative to the surrounding charge which fulfill the requirements for xerographic reproduction. By way of example, a discharge rate in the range of 12 to 25 percent and over would be satisfactory. Thus, a light emitting diode of the composition of gallium arsenide phosphide, with the gallium arsenide/phosphide relationship being in the ratio of 60–40, respectively, has been found to provide an efficient optical coupling to a xerographic photoreceptor of the characteristic composition noted above. Obviously, other mating optical generating and photoreceptive devices may be employed, the major requirement being only that the optical generating device provide sufficient surface discharge of a previously charged photoreceptive layer to enable xerographic development to transpire. Relative potential discharge levels in this regard may be as low as 12 percent surface potential contrast for a 60 micron thick film in a cascade development process.

Figure 3A:
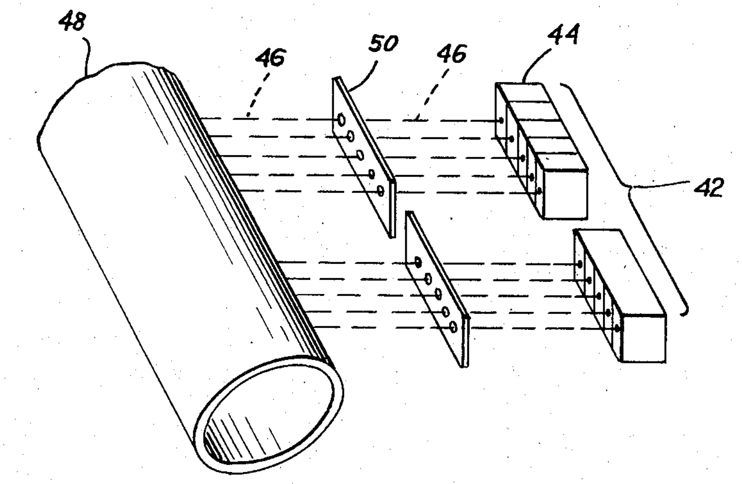
FIGS. 3A, 3B, 3C and 4 show preferred and alternative forms of optically coupling the solid state light emitting diode to a photoreceptive surface.

Referring to FIG. 3A, an example of optical coupling employing solid state light emitting devices in accordance with the present invention is illustrated with regard to the surface of a photoreceptive layer. As shown in FIG. 3A, a plurality of light emitting devices such as diodes 44 are arranged with the light emission path 46 traversing the spacing between the diode 44 and the photoreceptor surface 48 through a pinhole aperture mask 50. The pinhole aperture mask replaces a conventional lens system and serves to focus the light emitted from the diode 44 along the path 46 to the photoreceptor surface 48. The aperture mask may be a plate, composed of brass, and each pinhole may have a diameter of, for example, five thousandths of an inch and be spaced approximately 1.5 millimeters above the surface of the photoconductor. The aperture plate may be continuous or segmented, it only being necessary that each diode output be coupled to the photoconductor through an appropriate pinhole.

Figure 3B:
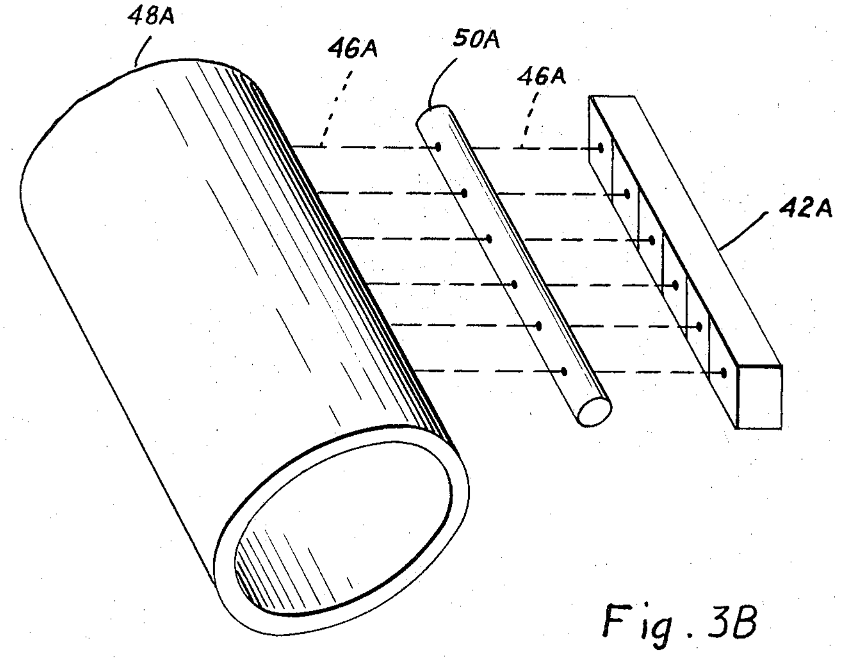
Figure 3C:
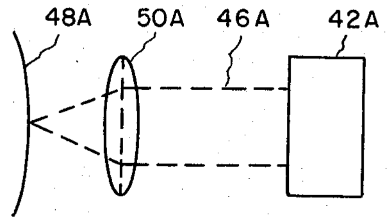

Referring to FIG. 3B, an alternative method of coupling emitted light to the surface of the photoreceptive layer is illustrated, wherein the aperture mask is replaced by a convex focusing lens illustrated as element 50A. In this embodiment, each individual diode making up the diode array 42A passes light through the lens 50A which is positioned with respect to the light emitting array such that the path of the light 46A is concentrated and focused in a specific point area on the photoreceptor 48A, as shown in greater detail in FIG. 3C. Typically, the lens may have an *f* equivalent of 5.6, and spaced an appropriate distance above the surface of the photoconductor to produce a good image. The lens 50A may consist of a plurality of individual lenses mounted opposite each individual light emitting diode or as shown may consist of a single long convex lens mounted proximate to the surface of the photoreceptive layer in conjunction with a light emitting diode array. Alternatively, groups of diodes may each have associated therewith a single lens accommodating the entire width of a single group of diodes.

Figure 4:
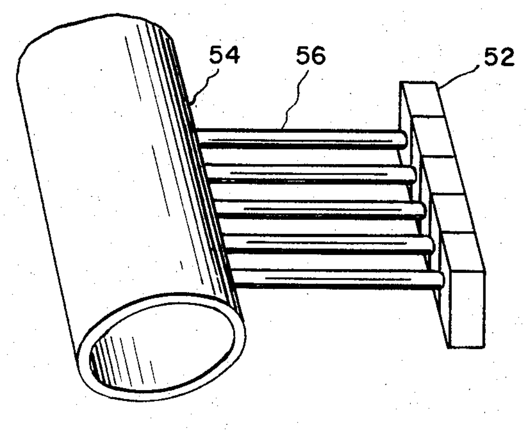

Referring to FIG. 4, an alternative method of coupling light to the surface of the photoreceptor is illustrated. As shown, an array of light emitting devices 52 each has its respective diode light output coupled to a photoreceptor surface 54 through a series of fiber optic cables 56. In this manner, light disbursement is kept to a minimum and interspacing between the respective light emitting elements may be kept relatively close in range.

Figure 5:
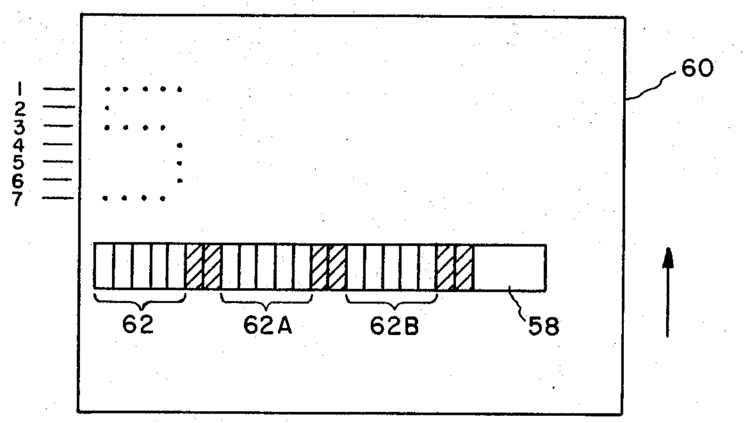
FIG. 5 is a pictorial representation of the manner wherein a linear array of light emitting solid state devices forms an alphanumeric character upon a photoreceptive surface in a line by line manner.

In either case, the formation of an alphanumeric, graphic or pictorial symbol is accomplished by a matrixing arrangement. As illustrated in FIG. 5, an array of light emitting diodes 58 is positioned above a photoreceptor 60 having a motion relative to the diode array 58 in the direction as indicated by the arrow. The surface 60 as explained heretofore has been previously charged to a predetermined level. The diode array 58 traverses the surface 60 and selectively discharges the surface by imposition of a light beam at an appropriate spot. FIG. 5 illustrates the formation of an alphanumeric character by use of this technique. As shown in FIG. 5, a matrix of 5 × 7 spots is employed. The character is defined by a width of 5 diode spot formations and a length of seven diode spot formations. As the surface 60 moves beneath the diode array 58, the character shown in FIG. 5, the number 5, is formed by appropriately pulsing diodes in the first array portion or segment 62 with a predetermined sequence of a plurality of line positions formed by the movement of the surface with respect to the array. Thus, as shown, 7 line positions are used to form a character of a five diode width. In operation, as the surface 60 traverses beneath the diode array 62 a first portion of the segment 62 is energized to form the discharged area or spot positions formed by line 1. For forming the character 5, as shown, all five diodes may be energized. During the next line, line 2, only the first diode is energized. During the third line the first 4 diodes and so on until a completed character is formed. Subsequent segments 62A, 62B, etc. may also be selectively energized during the same line time frame to provide full width character generation across the spacing of the document. Since the optical coupling between the diodes and the surface may be precisely controlled, as explained in connection with FIGS. 3 and 4, a plurality of characters may be simultaneously formed on a line by line basis across the width of the document to be processed by the surface image charge pattern formed on the photoreceptor 60.

Figure 6:
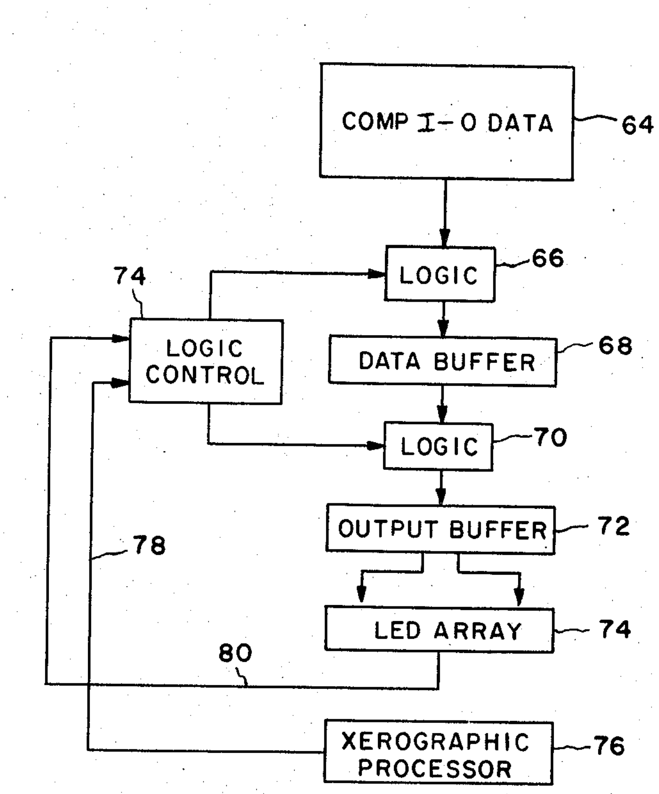
FIG. 6 is a general block diagram of the electrical relationship illustrating the manner wherein electrical input signals are employed to select elements of the light emitting solid state devices.

Referring now to FIG. 6 a generalized block diagram of the electronics is shown for providing the selective line by line printing sequence illustrated in FIG. 5.

The information to be converted by this invention into a pattern of light and shadow images is derived in its initial phase by means of appropriate electrical signals originating from a computer controlled input/output data entry device 64. This computer controlled input/output data entry device may consist of any appropriate electrical signal introduction apparatus for providing the necessary sequence of information. The input/output data entry device 64 may comprise a plurality of input lines derived from a computer memory or may be provided by means of a telephone or long line facility such as is well known in facsimile transmission and the like. The input/output data entry device is coupled through a first logic circuit 66 to an intermediate storage or data buffer unit 68. The data buffer unit 68 is intercoupled through a second logic unit 70 to an output buffer 72. A logic control circuit 74 controls the operation of the first and second logic units 66 and 70 as will be described in further detail below. The output of the output buffer 72 is coupled to a light emitting diode array 73 which in turn operates to process the xerographic processing unit 76 in the manner described above. Xerographic processing unit 76 is in turn coupled to the logic control unit 74.

The operation of the arrangement shown in FIG. 6 will now be described. Input information received from the input/output data entry device 64 is transferred through the logic unit 66 to the first data buffer under the control of the logic control unit 74. When the xerographic processor 76 indicates to the logic control unit 74 by means of a signal applied along the lines 78 that it is in condition to receive information to be processed for reproduction, logic control opens logic unit 66 and effectuates the transfer of information from the input/output data device 64 to the data buffer 68. Since it will be recognized that the exposure rates of the light emitting diode array 73 relative to xerographic processor 76 may not be the same as the information transmission rate from the input/output data entry device 64, the data buffer 68 arranges to receive the information from the data entry device 64 at whatever specific rate that device is transmitting and stores such information within the content registers of the data buffer 68 at such rate of processing of the xerographic processor 76. By means of an appropriate exposure control or like unit indicated generally as 80 an appropriate signal is applied along line 82 to the logic control unit 74 indicating that each sequence of information printed upon the xerographic processor by means of light emitting diode array 73 has been effectuated. As each sequence progresses, logic control unit 74 indicates by means of an appropriate signal to the logic control unit 70 that the output buffer 72 is ready to receive the next bit of sequential information to be supplied by the data buffer 68. In this manner, the output buffer 72 receives information from the data buffer 68 through the logic unit 70 and decodes and applies such information to the appropriate diodes within the light emitting diode array 73 to recreate the character in accordance with the information being transmitted. Conventionally, the output buffer may consist of an array of gates responsive to a predetermined condition of binary coded input signals for selecting one or more desired diodes within the light emitting diode array 73. If the desired display is alphanumeric, diodes may be arranged in the linear array of configuration shown in FIG. 5 and the information provided to the light emitting diode array 73 coded to trigger a sequence of light pulses across a line common to a plurality of characters. Graphic displays may be arranged by selecting any one of the diodes across the width of the array in the desired sequence. Pictorial or half tone displays may be formed by the selection of a diode triggered at any portion of its full output optical capability.

Figure 6A:
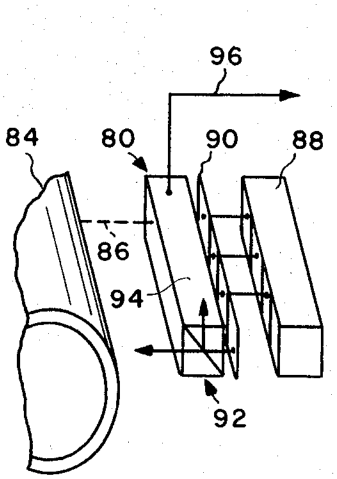
FIG. 6A illustrates an exposure control arrangement employed with the present invention.

Electronic keying of each individual diode may be accomplished rapidly in terms of a desired print rate. Since a conventional light emitting diode turn on and off time is of the range of 1 nanoseconds, a typical application will result in at least 500 microseconds available between pulsing of the light emitting diodes. Since state of the art circuitry is capable of performing 10,000 switching operations at the rate of 50 nanoseconds per operation, it will become apparent that for a standard print array consisting of a row of, for example, 1,000 emitting diodes, it is not necessary to simultaneously address each light emitting diode in a row but instead to sequentially address driving circuits connected to each light emitting diode. Taking this characteristic into account, an exposure device 80 as indicated generally in FIG. 6 may be provided in the form of a linearly extended photocell arranged in the path of the light beam for providing an electrical signal indicating proper exposure duration of an optical signal provided by a diode array. As shown in FIG. 6A a photoreceptor surface 84 receives light along a path 86 from a plurality of light emitting diodes 88 through the apertured pinhole mask 90 in the manner described above in connection with FIG. 3. An element 92 in the form of a beam splitting light prism is affixed to one side of the pinhole aperture 90. Affixed to the beam splitting prism 92 is an extended photoelectric responsive member 94 which may extend linearly along the length of the entire array. Since the sequencing of the diodes in this particular embodiment is designed to occur such that only one diode is on at any particular instance during a particular line print operation, a common electrical outlet may be derived from the prism and is indicated generally as appearing along line 96. Line 96, corresponding to the line 82 shown in FIG. 6, provides the appropriate output signal to the logic control unit 74 indicating that the next successive electrical output may now be applied to the output buffer 72 for selection of the next successive diode.

Figure 7:
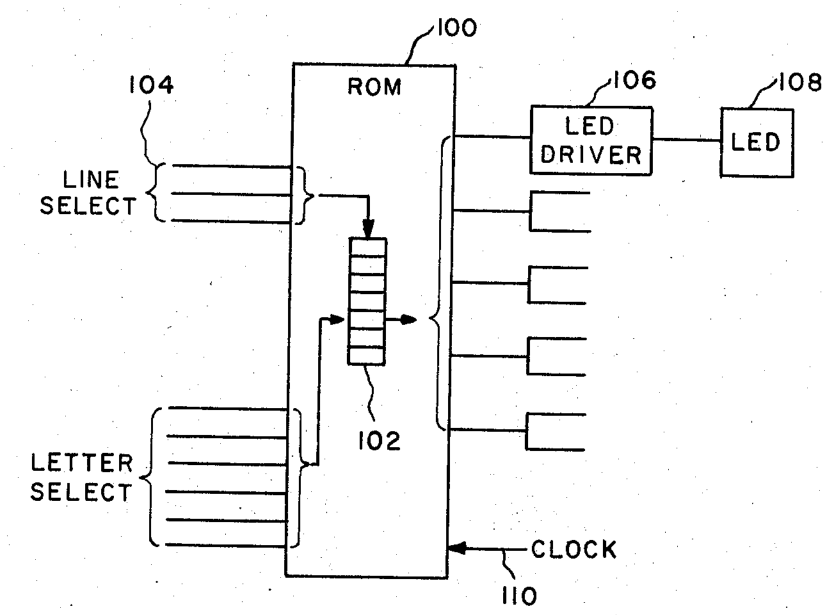
FIG. 7 illustrates a further manner of selection of desired elements of a solid state light emitting array.
Figure 8:
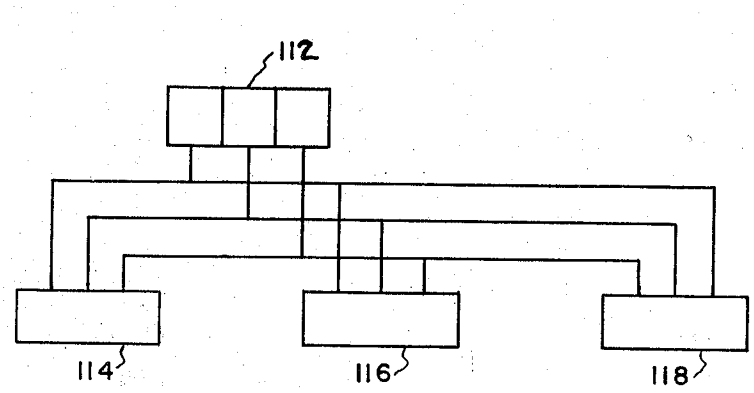
FIG. 8 illustrates a manner wherein a single register is employed to select groups of light emitting solid state devices within a linear array of such devices.

Referring now to FIG. 7, the operation of the selection of a series of groups of five light emitting diodes for purposes of an alphanumeric character display will be explained. As part of the output buffer circuitry 72, data information derived from the data buffer 68 which is in the form of letter selection coded information can be applied to a read only memory unit 100 (ROM) which contains a plurality of stored locations representing any number of alphanumeric characters desired for display. As illustrated in FIG. 7, a letter selection input consists of six binary lines representing a possible combination of 64 states which to purposes of this embodiment would represent a possible 64 alphanumeric characters. Provision of an additional selection line, resulting in seven inputs to the read only memory 100 would result in 128 states and so on. Read only memory 100 includes a plurality of internal memory states, preconditioned in well known manner, each corresponding to desired alphanumeric character. Selection of a specific memory location such as memory location 102 is accomplished by a specific combination of binary inputs along th letter select input lines. Memory location 102 includes a predetermined sequence of seven groups of binary bits, each group representing the state of diodes on a line by line sequence for a given character. Upon selection of a memory location 102 with its predetermined seven groups of states, energization of a line selection input 104 results in memory location 102 being fed out to each of the respective light emitting diode driving units 106 and in turn to the light emitting diode 108. The operation of the read only memory is controlled by the speed of a clock signal applied along an input line 110. Synchronization between respective groups of characters provided by pluralities of groups of light emitting diodes are provided by controlling the line selection input 104 by means of a common counter. Since each line selection is designed to provide seven output conditions determining the entire character length, a three state line selection is sufficient to accomplish the counting function necessary in this regard. By providing a common counter 112 intercoupling each of a plurality of read only memories 114, 116, and 118 as shown in FIG. 8, synchronized operation can be provided on a line by line basis for a plurality of characters across the width of a photoreceptive surface.

Figure 9:
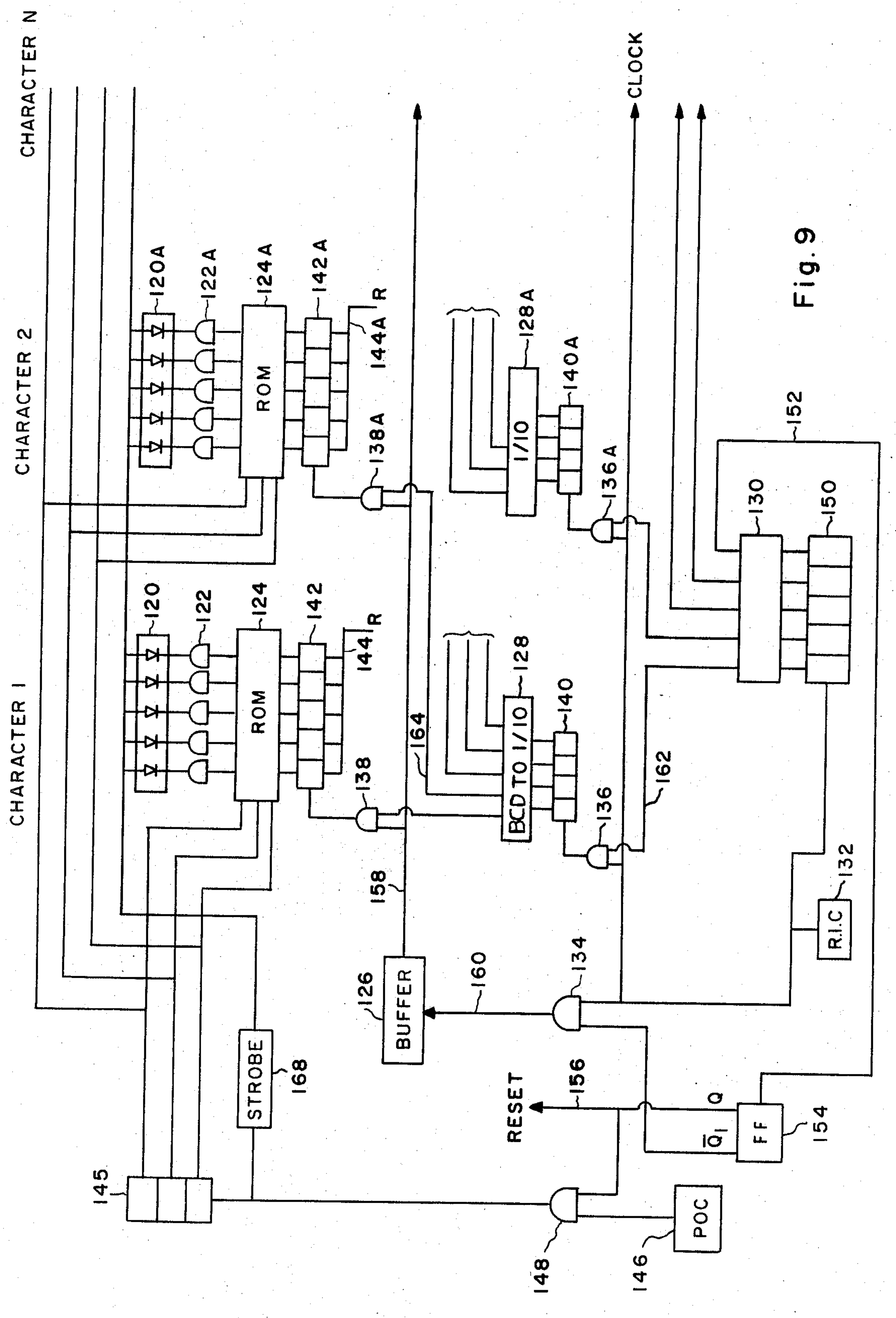
FIG. 9 is a schematic diagram of an embodiment of one form of logic circuitry for selection of solid state light emitting devices.

Referring now to FIG. 9, an arrangement for keying in pluralities of arrays of light emitting diodes in accordance with an alphanumeric printing is illustrated. The format employed for alphanumeric printing is similar to that described above in that an array of five light emitting diodes is employed to print each character line. As shown in FIG. 9, a plurality of light emitting diode arrays arranged in groups of five are illustrated, with an exemplary two out of N array, wherein N represents the total number of characters desired across a line. The diode arrays 120, 120A each include five diodes for emitting light in accordance with a keyed input to be applied to a photoreceptor surface as described above. Each diode is coupled by means of a driver 122 from a read only memory unit 124 operating as explained in conjunction with the read only memory described in FIG. 7. Information is supplied from a buffer device 126 which may be in the form of an off line storage device such as a magnetic tape or magnetic core storage memory and the like, which has in turn received information from the output of a computer unit in the manner explained above in connection with FIG. 6. Information is fed from the buffer 126 sequentially and placed in a read only memory unit selected by means of a plurality of selection devices 128, 128A and 130, operative to provide a one out of M output, where M is the total number of outputs of each selection device, in response to a binary coded input. The sequential operation of the selection devices is controlled by means of a read in clock source 132 operating through gate 134 to the buffer 126, and through the gates 136 and 136A to binary counting devices 140 and 140A. The binary counting devices 140 and 140A may consist of a chain of flip-flops serially interconnected so as to be sequentially energized by the pulses sequentially appearing at the outputs of gates 136 and 136A respectively. Selection is made by the selection devices 128 and 128A through gates 138 and 138A, respectively, each in turn coupled to binary devices 142 and 142A, respectively. The binary devices 142 and 142A may similarly consist of a chain of sequentially interconnected flip-flops responsive to serial outputs from the gates 138 and 138A for storing pulse sequence in binary fashion. Each of the binary devices 142, 142A, etc. include a reset line 144, 144A which, when energized, will reset the binary counting devices to their original conditions. After selection of a character in each of the read only memory devices 124, 124A, etc., printout is effected by means of the sequential operation of a further binary counting device 145 which provides seven output pulses to each read only memory for providing the seven print line characteristics as noted in connection with the operation of this device as described above. The binary counting device 145 may itself consist of a chain of flip flops serially interconnected so as to provide a sequential binary count in response to its series of pulses received along the input line thereof. The counting rate of the binary counting device 145 is controlled by a printout counter 146 operating through gate 148. A further binary counting device 150 operates under control of the read in clock 132 to provide sequential energization of the selection device 130 for selecting the selection devices 128, 128A, etc. in a manner which will be described further hereinbelow. The last output state of the selection device 130 is coupled back along the line 152 to a flip-flop 154, causing the output state thereof to change and provide a reset pulse along the line 156 for resetting binary devices 142 and 142A and removing therefrom the information previously stored therein.

Briefly describing the operating of the arrangement shown in FIG. 9, input information is sequentially fed from the buffer unit 126 along the line 158 to each of the gates 138, 138A, etc. The output of the buffer is controlled by means of an input along line 160 which is in turn derived through the gate 134 corresponding to an output condition from the flip-flop 154 indicating that the device has completed its prior operation and is reset, or is in a position now to initiate a new print cycle. At the same time, the read in clock 132 is energized, energizing the binary counting device 150 for causing the selection device 130 to apply a first output along its first output line 162 to the gate 136, in turn providing an initial count from the binary counting device 140 which in turn energizes the selection device 128 for applying a first pulse through the gate 138 and allowing the sequentially applied information relating to the selection of the first character to be placed in the counting device 142. The read only memory 124 responds to the state of each of the flip-flops, in the counting binary device 142, to select a character previously stored in the read only memory 124 and, as described in FIG. 7, the memory then acts to select the appropriate diode units 120 through the drivers 122 for printing. Since the characters are defined by selection of storage locations, the input information is in the form of binary addresses, which has the advantage of simplifying the design of the external data unit. The read in counting rate is such that information relating to each character as placed in the counters 142, 142A, etc. is accomplished prior to each state change causing the selection device 128 to switch to its next successive state as represented by an output condition appearing along successive lines such as line 164 of the selection device 128. The signal appearing along line 164 in turn opens gate 138A allowing the next sequential line information appearing along line 158 from the buffer 126 to be stored in the counting chain 142A in the same manner as described with connection with counting chain 142. The sequence continues until all of the selections represented by the range of the selection device 128 have been completed. At this time, the selection device 130 switches its condition such that an output pulse now appears along the line 166 of the selection device 130 thereby opening gate 136A and beginning the sequential selection represented by the outputs of the selection device 128A. Each of the selection devices 128, 128A and 130 are of the type which respond to a binary coded decimal input to provide a 1 out of M output, where an M represents the number of outputs of each selection device. Thus, by way of illustration, if a character row of twenty characters is to be formed, then this embodiment requires a minimum of 20 read only memory units. In this case, should the selection devices 128 and 128A be capable of selecting one out of 10 outputs thereof in accordance with a binary coded decimal input, then a minimum of two of these units would be required in order to select the total of 20 read only memories. Since only two selection devices 128 and 128A are necessary, then the selection device 130 need select only one out of two outputs in accordance with a binary coded decimal input. The arrangement illustrated in FIG. 9 is designed to illustrate that any desired number of characters may be formed by expansion of the selection device. When each read only memory has been supplied with a coded representation selecting a character to be printed, represented by the selection device 130 having achieved its last output, the change in state of the last output condition of the selection device 130 can be coupled along a line 152 to a flip-flop unit 154 for providing a gating signal through the gate 148 which is used to energize the gate 148 and pass the print out count pulses to the counter 145 and a strobe device 168. The strobe device is coupled to all the diodes and causes simultaneous printing of every diode selected by each appropriate read only memory output condition state for each counting state reached by counter 145. At the same time, a reset pulse is applied at the input of each read only memory counter 142, 142A to clear it for receipt of the next successive line information condition. The strobe may be made as long or as short as is desired to generate the required light necessary for the minimum exposure required for sufficient contrast to enable a xerographic reproduction to be made. In this regard, the exposure device set forth in FIG. 6A may be employed wherein the output signal therefrom may control the length of the strobe pulse, and thereby effect the intensity of exposure. Other forms of control may also be employed.

Figure 10:
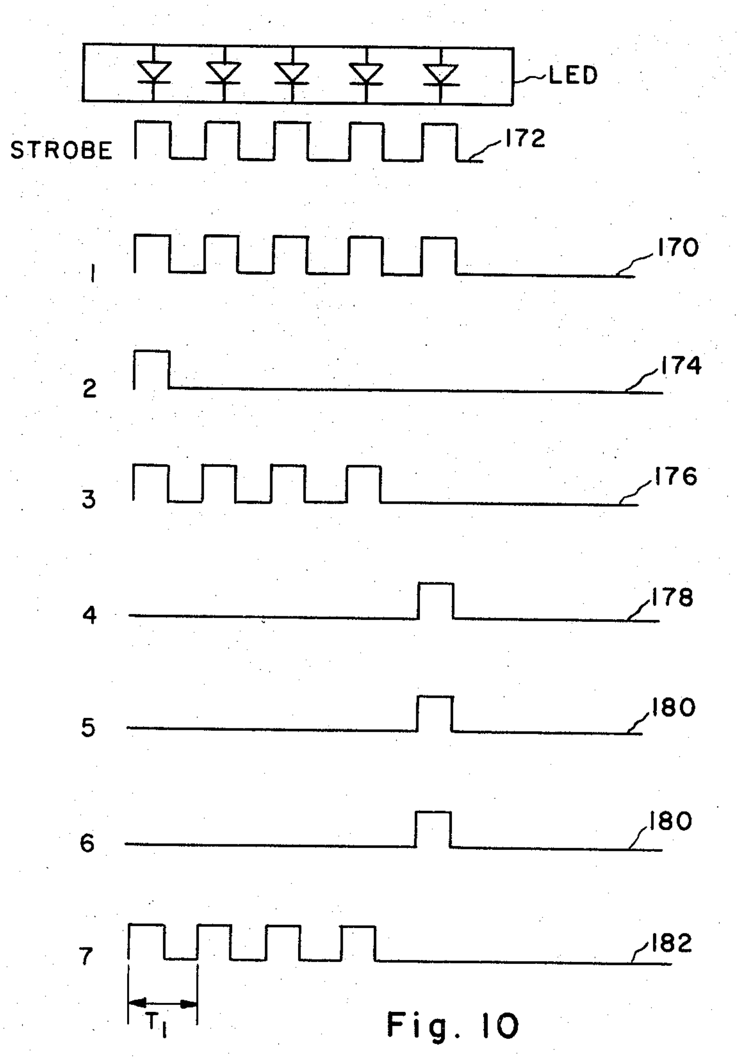
FIG. 10 is a timing and waveform diagram illustrating strobing and selection.

Referring now to FIG. 10 a waveform illustration describing the relationship of the strobe pulse to each line diode condition is illustrated. Again, a five diode array is assumed, an alphanumeric character indicated as a numeral 5 is assumed to be generated and a 5 × 7 dot matrix forming the character is also presumed. For this character the first line entered into a read only memory results in the character condition shown along axis 170 corresponding to the first input print line. In this condition, each of the light emitting diodes, shown aligned with each axis for purposes of illustration, is on, and the application of a strobe pulse of the duration indicated, corresponding to a portion of the time period T1 is applied as shown along line 172 to each diode resulting in a diode on time as shown by the duration of the pulse occupying the same portion of T1 as the strobe pulse. The second line 172 shows that the second line of information requires only a single diode be placed in an on condition, a third line 176 requiring only four on diodes, the fourth line 178 requiring only one on diode, the fifth line 180 requiring one on diode, the sixth line 182 requiring one on diode and the last line 184 requiring four on diodes. As each successive line by line print is made, the on time of each diode creates a dot matrix forming the character 5.

Figure 11:
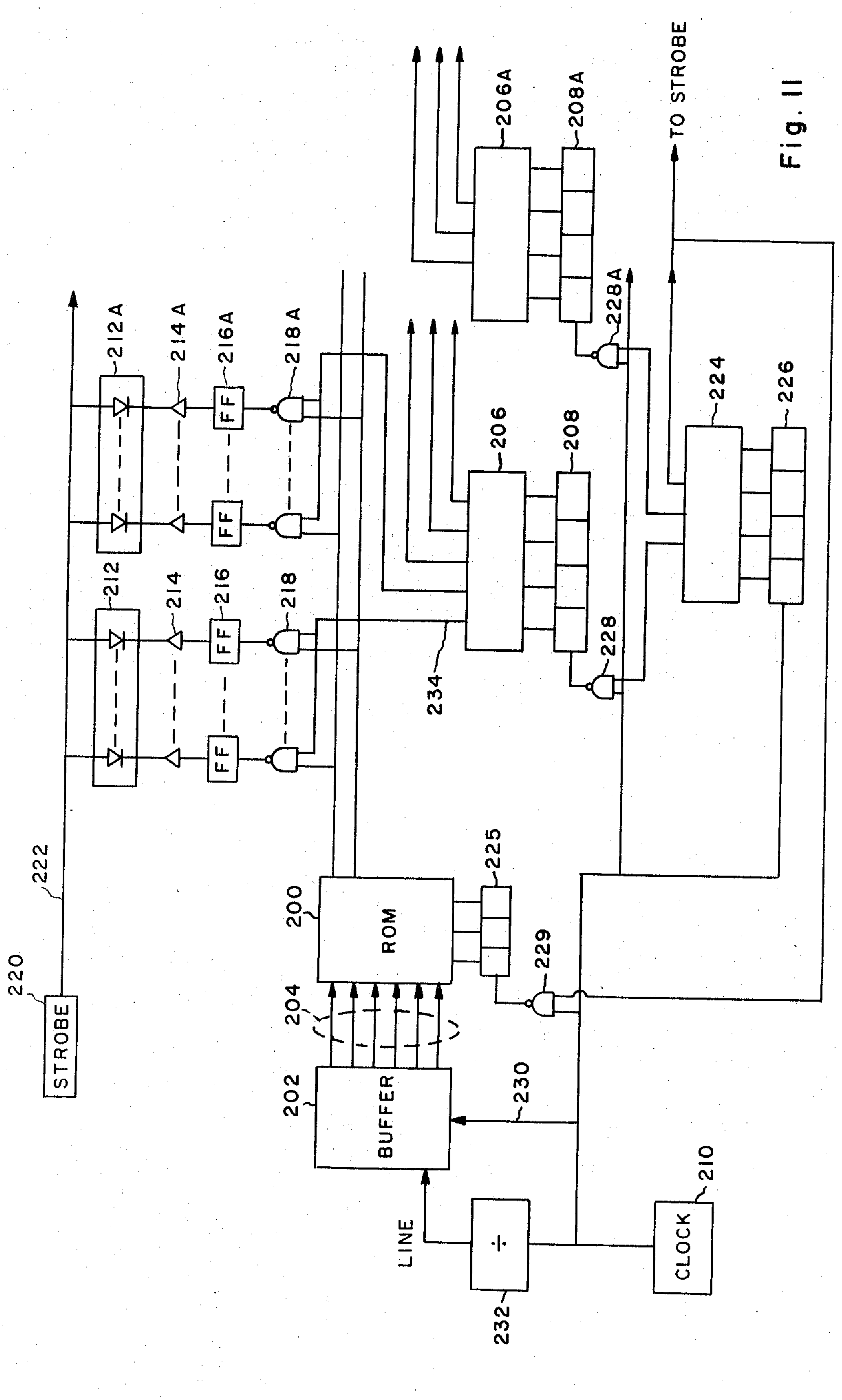
FIG. 11 shows a further embodiment of logic selection for alphanumeric character generation.

Referring now to FIG. 11, another embodiment for creating alphanumeric characters is illustrated. In the embodiment of FIG. 11, only a single read only memory is shown for decoding all of the characters before entry of information into the light emitting diodes. In this arrangement, it is necessary to address the read only memory seven times for each character in order to set up the required condition across all of the light emitting diode array prior to energization of a strobe condition. Thus, as shown in FIG. 11 read only memory 200 is addressed by the buffer unit 202 along a plurality of input address lines 204. As described in connection with FIG. 9 a plurality of selection devices 206, 206A are provided, each addressed by means of binary counting devices 208, 208A. Selection devices 206, 206A operate to sequentially select, under the control of a clock signal provided by a source 210, pluralities of light emitting diode arrays. Light emitting diode arrays, indicated as 212, 212A, are each selectively addressed by means of drivers 214, 214A which are in turn coupled to storage flip-flop units 216, 216A which in turn receive information through NAND gating units 218, 218A from the read only memory 200. Strobe signals are applied from a strobe source 220 along line 222 to each of the light emitting diode arrays 212, 212A, etc. Again assuming a seven line sequence, a three stage counter 225, operated by the clock source 210 provides three binary outputs resulting in a count of seven to the read only memory 200. Further selection device 224 which in turn operates under the control of a binary selection counter 226 provides the respective selection of the units 206, 206A through the gates 228, 228A, respectively and through the binary counting devices 208, 208A, respectively, in the manner as described aforesaid in connection with FIG. 9. Since the relationship between number of characters and lines can be precisely determined, the buffer 202 can operate under the control of the clock 210 by means of appropriate input applied along the line 230 for advancing the buffer for each information line per character and, by dividing the clock rate through a suitable digital dividing unit 232, can determine shifting from line to line after each respective complete line of characters has been read out of the buffer 202 and into the read only memory 200 along the lines 204.

The operation of the device illustrated in FIG. 11 will now be described. Input signals appearing from the buffer 202 energizing read only memory unit 200 select each character to provide the appropriate coded inputs through the respective NAND gates associated with respective groups of light emitting diodes. Thus, at the beginning of the cycle, activation of the counting unit 226 provides a first pulse appearing from the output of the selection device 224 opening gate 228 and in turn initiating the operation of counting device 208 for applying a pulse to the selection device 206, in turn activating its first output line 234 to open the NAND gate 218 for application of the first line of information of a first character selected from the read only memory 200 to the storage devices 216 corresponding to the first light emitting diode array 212, determined by the first state of the counter 225. As each character is selected out of the read only memory, subsequent selections are made by the selection devices of subsequent light emitting diode arrays until the first line of each character is stored in each set of storage devices 216, 216A and an entire character line is formed. Upon the completion of formation of storage the entire character line, the strobe unit 220 is activated, as by a pulse from the last storage of the selection device 224 applying a strobe pulse along the line 222 and causing a simultaneous printout by means of the light emitted by each light emitting diode array 212, 212A, etc. until the entire line of characters is formed. The strobe may be controlled by an exposure device as stated hereinbefore in connection with FIG. 9. The cycle repeats on the line by line basis until an entire row of characters is completely formed. The sequential state of counter 225 determines each line storage, and is advanced at the end of each line storage by means of an output pulse supplied from the last stage of the selection device 224 gating a clock pulse from the clock source 210 to the counter 225 by means of NAND gate 229.

The embodiments of FIG. 9 and FIG. 11 have each been illustrated for characters formed with a 5 × 7 matrix. It should be obvious that formation of higher or lower resolution characters can be made by redesigning the matrix for greater or lesser numbers of print points.

Figure 12:
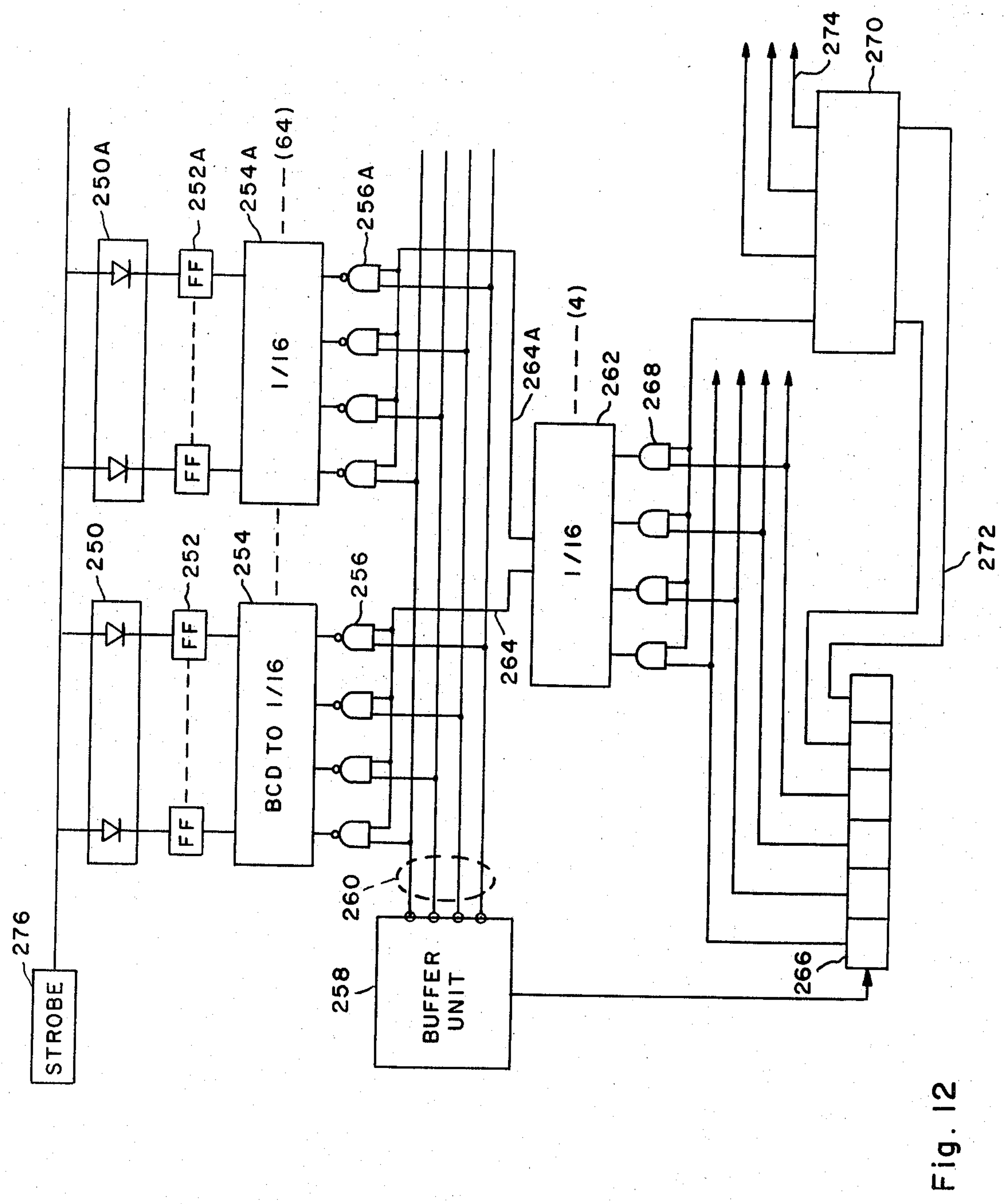
FIG. 12 is an illustration of a logic selection scheme for graphic or pictorial character generation.

Referring now to FIG. 12, an embodiment for triggering graphic or pictorial displays is presented. In this embodiment, although the light emitting diodes continue to be arranged in groups, it will be understood that the diode spacing and separation may be made uniform or non-uniform in accordance with the desired resolution of the output pictorial image. Selection of the diodes is again made by use of selection devices and binary counting devices in a manner similar to those described in connection with FIGS. 9 and 11. Thus, light emitting diode arrays 250, 250A are provided in linear array across the surface of the reproducing medium. Each light emitting diode includes a plurality of storage flip flop units 252, 252A which are in turn connected to a binary selected one out of M selection circuit 254, 254A. Binary inputs to the selection circuit 254, 254A are provided by pluralities of NAND gates 256, 256A each of which are in turn energized by appropriate outputs appearing from a buffer unit 258 along a plurality of input lines 260. For purposes of illustration, a four line binary information input system is employed, thereby requiring four output lines from the buffer unit and four NAND gates respectively coupled to each of the successive selection units 254, 254A. A further selection unit 260 operates to sequentially select each of the selection units 254, 254A for the entry of appropriately decoded information appearing from the buffer 258 along the common lines 260. Sequential operation occurs by sequential pulsing of output lines 264, 264A which in turn open simultaneously each of the gates 256, 256A, etc. Selection of the selection unit 262 is effected by the sequential operation of a binary counter 266 which is in turn energized at a clock rate derived from the buffer unit 258. Sequential operation of the counter unit 266 acts to sequentially provide the one out of M output from the selection device 262 upon activation of the input gates 268 coupled to the selection device 262. The gates 268 are each actuated by means of further selection device 270 operating off the last two states of the counting device 266. By way of example, if a linear diode array of 1024 diodes is desired for forming a pictorial image, and each diode array 250, 250A is presumed to include 16 diodes, then selection device 254, 254A each convert binary coded decimal input to one out of 16 outputs sequentially and thus requires 64 of the selection units 254, 254A. The selection of 64 selection units 254, 254A would require four of the 262 selection devices, which would in turn require four outputs from a final selection device 270. Obviously, greater or lesser numbers of selection devices may be employed for selecting various numbers of diodes as desired.

In operation, the embodiment of FIG. 12 provides for placement of information on selected ones of an array of diodes and energizing those ones of diodes to provide a graphical or pictorial display. At the beginning of an operation, the buffer unit 258 provides an initial operating signal to the counter 266, thereby activating the first line on the counter 272 and selecting through the selection unit 270 the selection of selection unit 262. Selection of the selection unit 262 activates line 264 and opens gates 256 for placing binary coded decimal information on lines 260, selecting an appropriate one out of M diode lines connected to the output of the selection circuit 254. Upon selection, the selection state is stored in one of the flip-flop units 252. The next successive change of state of the counter 266 operates to cause selection of the selection unit 262 to switch to the next successive line 264A, thereby opening gates 256A and allowing the next successive binary coded decimal information from the buffer unit 258 to select one out of M diode lines at the output of the selection circuit 254A. This information is stored in the appropriate flip-flop units 252A. The cycle continues until all of the selection circuits 254, 254A, etc. have been energized. The cycle further continues until all of the selection circuits corresponding to circuit 262 have likewise been selected. At the end of this selection period, as indicated by a final output condition derivable from the last output line 274 of the selection circuit 270, the strobe circuit 276 is energized, thereby permitting all of the diode arrays 250, 250A, etc. to print out simultaneously. In this manner the pictorial or graphic display desired is presented. As was described in connection with previous embodiments, the variation of the width of the strobe pulse may be made to increase or decrease the contrast and thus the density of the image imparted to the photoreceptor layer.

Figure 13:
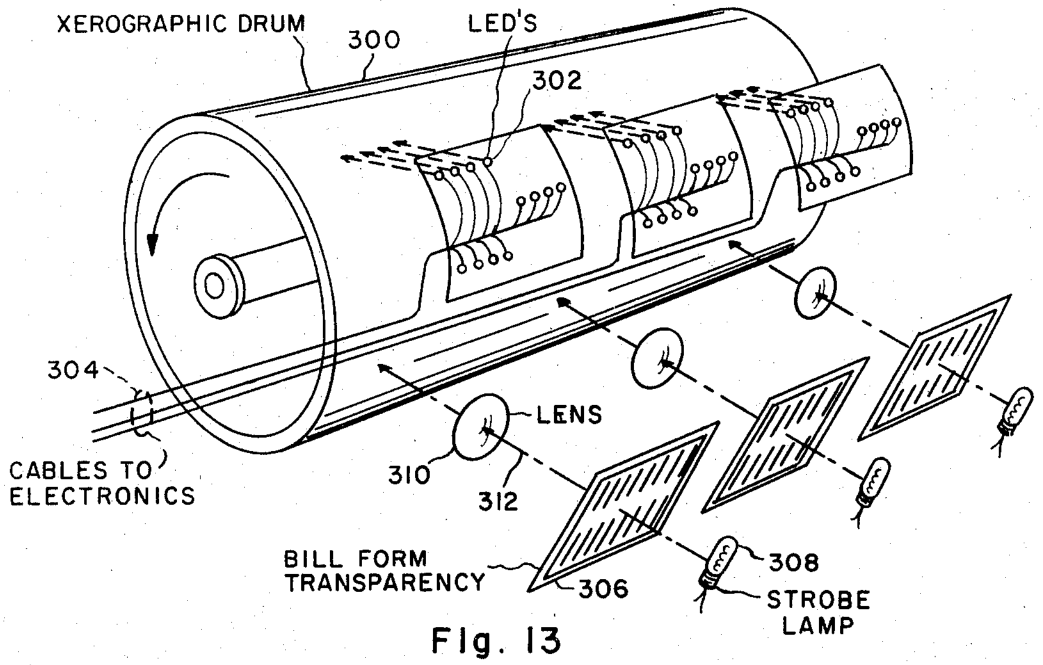
FIG. 13 illustrates the use of the invention in a high speed format printer.

Referring now to FIG. 13 an additional embodiment of the invention is illustrated for providing fixed array printing. This embodiment has particular application to the high-speed printing of pre-existing formats such as invoices, bills, or labels. As shown in FIG. 13, an otherwise conventional xerographic drum 300 is provided with a plurality of light emitting diodes 302, operative as described above, and arranged in a predetermined pattern above the photoreceptive surface of the xerographic drum. Energization lines 304 coupled to external electronics operating in a manner described above in connection with the previously noted embodiments interconnects the diodes and provides access thereto. Pre-existing forms 306 are mounted proximate to a printing area of the drum and are optically coupled to the drum by means of a strobe lamp 308 and a focusing lens 310 along an optical path 312. In operation, the strobe lamp 308 can be energized to provide a projection of the form, which is in the nature of a transparency, through the lens onto the surface of the rotating xerographic drum to form a corresponding electrostatic latent image. The light emitting diode array 302 is then sequentially energized to print characters into appropriate blank spaces left in the bill form and thereby provide an overlaying image in the appropriate configuration on the projected form with a minimum amount of printing necessary. Conventional development may then be employed, and printout effected of the resultant final electrostatic latent image. Obviously the arrangement of light emitting diodes can be predetermined in order to fit whatever format is desired to be printed on the xerographic reproducing surface. Various combinations of light emitting diodes can be employed to produce both alphanumeric and pictorial representations by use of the appropriate selection circuitry as described in the heretofore detailed figures.

Other variations and changes will be obviously apparent to those skilled in the art. It will be understood that the devices shown in the various embodimens are done so for purposes of illustration, and, that the invention may be modified and embodied in various other forms without departing from the scope and spirit of the invention.

What is claimed is:

1. A character printing arrangement comprising a photoreceptive surface adapted for continuous movement in a predetermined direction, means for charging said photoreceptive surface, means for selectively discharging portions of said area to form a character pattern of charged and discharged portions of said area on a line by line basis, said pattern thereby forming an electrostatic image, said means including a linear array of solid state light emitting devices positioned transversely with respect to said movement, logic selection means coupled to each segment of a plurality of segments of said devices, each said segment including a plurality of said devices, said logic selection means energizing selected devices within each of said segments with a predetermined sequence over a plurality of line positions formed by the movement of said surface with respect to said array, said logic selection means including a plurality of storage units, each coupled to a respective one of said devices, a memory, a plurality of gates each coupled to a respective one of said storage units, one input of each gate coupled to said memory, decoding means having a plurality of outputs, each output common to an input of each gate corresponding to a common segment of said devices, means for sequentially energizing each successive decoder output and thereby enabling successive segments, means for reading character line information related to a character corresponding to an enabled segment into said storage units associated with said segment, mean responsive to completion of said decoder sequences for causing said storage units to energize said selected devices, control means coupled to said logic selection means and responsive to selection of a desired character for printing to initiate said predetermined sequence corresponding to said character in said logic selection means, means positioned on said surface and responsive to said electrostatic latent image for developing said image to form said printed character, a counter for advancing said memory on a line by line basis, and means coupling the last stage of said decoder to said counter for advancing said counter.

2. A character printing arrangement comprising a photoreceptive surface adapted for continuous movement in a predetermined direction, means for charging said photoreceptive surface, optical means for selectively discharging portions of said area to form a pattern of charged and discharged portions of said area, said pattern thereby forming an electrostatic image, said optical means including a linear array of solid state light emitting devices positioned transversely with respect to said movement and optically coupled to said photoreceptive surface, logic selection means coupled to each segment of a plurality of segments of said devices, each said segment including a plurality of said devices, said logic selection energizing selected devices within each of said segments with a predetermined sequence over a plurality of line positions formed by the movement of said surface with respect to said array, control means coupled to said logic selection means and responsive to selection of a desired character for printing to initiate said predetermined sequence corresponding to said character in said logic selection means, an exposure control coupled to each of said devices for measuring the minimum permissible light output from said devices for providing an output signal indicative thereof, said logic selection means responsive to said output signal for the next energization of selected devices, and means positioned on said surface and responsive to said electrostatic latent image for developing said image to form said printed character.

3. A character printing arrangement comprising a photoreceptive surface adapted for continuous movement in a predetermined direction, means for charging said photoreceptive surface, means for selectively discharging portions of said area to form a pattern of charged and discharged portions of said area, said pattern thereby forming an electrostatic image, said means including a linear array of solid state light emitting devices positioned transversely with respect to said movement, logic selection means coupled to each segment of a plurality of segments of said devices, each said segment including a plurality of said devices, said logic selection means energizing selected devices within each of said segments with a predetermined sequence over a plurality of line positions formed by the movement of said surface with respect to said array, said logic selection means including a first plurality of memory units each responding to a uniquely coded input to select a memory location wherein a character represented by a plurality of character line states is located corresponding to said uniquely coded input, gating means coupled to each of said memory units, a plurality of decoders, each of said decoders sequentially enabling each of said gating devices, means for applying said uniquely coded input representative of a location to be selected through each of said gates to each of said memory devices, said memory units thereby having sequentially selected therein the desired device energization information, and means coupled to each of said memories to cause said energization of a character row upon completion of said sequential store, control means coupled to said logic selection means and responsive to selection of a desired character for printing to initiate said predetermined sequence corresponding to said character in said logic selection means, and means positioned on said surface and responsive to said electrostatic latent image for developing said image to form said printed character.

4. The combination of claim 3 wherein said last named means is a counter coupled to each of said memory units for simultaneously causing each memory unit to energize appropriate devices corresponding to information stored at said selected locations to form said character row on a line by line basis.

5. A printing arrangement comprising a photosensitive surface having a charged area, illumination means for selectively discharging portions of said area, charged and discharged portions of said area thereby forming an electrostatic latent image, said illumination means including a single row of light emitting solid state devices, means for selectively energizing said devices for selectively discharging said portions to form said electrostatic latent image, means for developing said electrostatic latent image, and means for selectively energizing selected ones of said device simultaneously, said selected ones representing a single line of a plurality of characters, said characters being completely constructed by successive simultaneous energization of selected devices in said row over a predetermined time period, said row of devices arranged in segments, each segment including a plurality of devices, each segment associated with a character space, said means for selectively energizing comprising a plurality of read only memory units, one unit associated with each segment, said memory units capable of controlling the selection of said devices to be energized, said units having an address input, a gating input, and an output, said units being capable of providing in response to a single character code input representative of a character to be printed a plurality of outputs in response to successive different gating inputs, whereby the address input of said unit is first addressed with a code representative of a character to be printed by its associated segment and in response thereto said unit provides a plurality of selection codes in response to a plurality of gating codes, each selection code representative of a single line of character information, a plurality of said lines making up a completed character.

* * * * *